(12) United States Patent
Chou et al.

(10) Patent No.: US 7,995,297 B2
(45) Date of Patent: Aug. 9, 2011

(54) PIEZOELECTRIC DRIVING MODULE, CAMERA MODULE USING SAME AND PORTABLE ELECTRONIC DEVICE USING SAME

(75) Inventors: Tai-Hsu Chou, Taipei Hsien (TW); Chi-Wei Chiu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/756,109

(22) Filed: Apr. 7, 2010

(65) Prior Publication Data

US 2011/0075280 A1    Mar. 31, 2011

(30) Foreign Application Priority Data

Sep. 25, 2009    (CN) .......................... 2009 1 0307687

(51) Int. Cl.
G02B 7/02     (2006.01)
G02B 15/14    (2006.01)
H02N 2/00     (2006.01)

(52) U.S. Cl. ........ 359/824; 359/694; 359/696; 310/311; 310/317; 310/323.02; 310/323.07; 348/374

(58) Field of Classification Search .......... 359/694–698, 359/819–824; 396/79–83, 133, 137; 348/240.3, 348/345, 374; 310/82, 317, 323.02, 323.07, 310/323.16, 323.17, 328, 366
See application file for complete search history.

(56) References Cited

U.S. PATENT DOCUMENTS

| 5,191,688 | A  | * | 3/1993  | Takizawa et al. ............ 29/25.35 |
| 5,644,440 | A  | * | 7/1997  | Akada ........................... 359/823 |
| 5,812,330 | A  | * | 9/1998  | Akada ........................... 359/823 |
| 5,854,528 | A  | * | 12/1998 | Nishikura et al. ....... 310/323.01 |
| 6,078,440 | A  | * | 6/2000  | Ueyama ....................... 359/824 |
| 7,457,060 | B2 | * | 11/2008 | Paik et al. ................... 359/824 |
| 7,706,089 | B2 | * | 4/2010  | Koc et al. .................... 359/824 |
| 7,764,449 | B2 | * | 7/2010  | Koc et al. .................... 359/824 |
| 7,777,969 | B2 | * | 8/2010  | Shirono et al. ............... 359/698 |

* cited by examiner

Primary Examiner — Loha Ben
(74) Attorney, Agent, or Firm — Raymond J. Chew

(57) ABSTRACT

An exemplary piezoelectric driving module includes a movable barrel, a fixed barrel receiving the movable barrel, a piezoelectric actuator, and a spring member. The piezoelectric actuator is configured for moving the movable barrel relative to the fixed barrel. The piezoelectric actuator includes a piezoelectric body mounted on the sidewall of the fixed barrel and a friction member mounted on the piezoelectric body. The piezoelectric body is configured for driving the friction member to generate elliptical vibration. The friction member is in frictional contact with the movable barrel. The spring member connects the movable barrel to the fixed barrel. The spring member is configured for providing an resilient force to make the movable barrel be in frictional contact with the friction member such that the friction member can be driven by the piezoelectric body to move the movable barrel along the central axis of the fixed barrel.

20 Claims, 5 Drawing Sheets

PIEZOELECTRIC DRIVING MODULE, CAMERA MODULE USING SAME AND PORTABLE ELECTRONIC DEVICE USING SAME

BACKGROUND

1. Technical Field

The present disclosure relates to actuators and particularly, to an piezoelectric driving module, a camera module with the piezoelectric driving module, and a portable electronic device with the camera module.

2. Description of Related Art

With the development of the optical imaging technology, camera modules are widely used in a variety of portable electronic devices, such as mobile phones, and personal digital assistants (PDAs).

Some portable electronic devices, for example, third generation (3G) mobile phones, usually include camera modules. The camera modules use actuators to achieve a zooming or auto-focusing function. Typical actuators include, for example, stepper motors. It is usually necessary to use a gear assembly to transform the rotational movement of the actuators into a linear movement. However, the gear assembly generally makes the camera modules excessively bulky. Furthermore, the occurrence of backlash/recoil in the gear assembly may result in degraded focusing accuracy.

Therefore, what is needed is a new driving module, a camera module with the new driving module, and a portable electronic device with the camera module, which can overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one. Embodiments will now be described in detail below with reference to the drawings.

Figure 1:
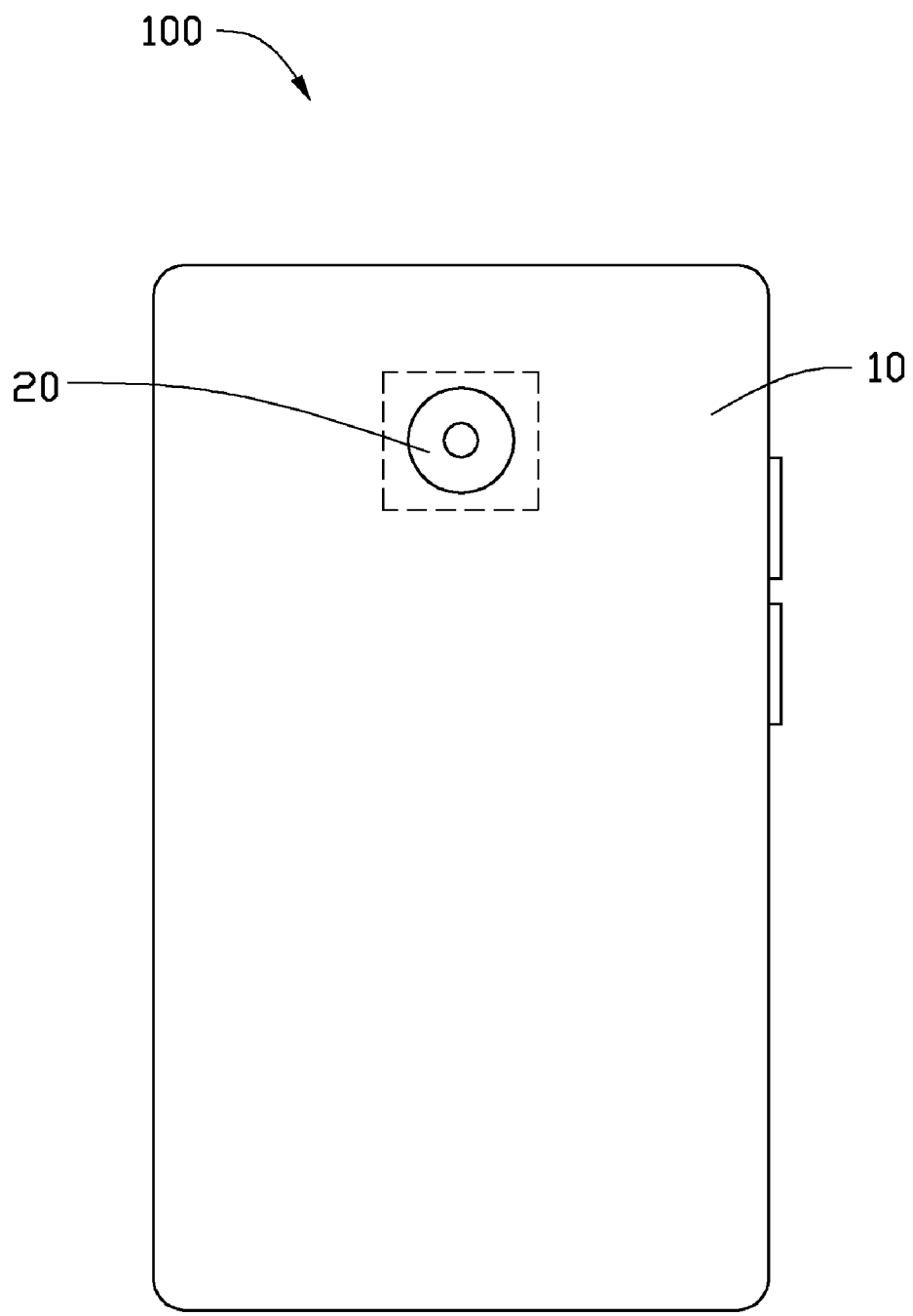
FIG. 1 is an isometric view of a portable electric device according to a first embodiment.

Referring to FIG. 1, a portable electric device 100, in accordance with a first embodiment, is shown. The portable electric device 100 includes a main body 10, and an auto-focusing camera module 20 mounted on the main body 10.

Figure 2:
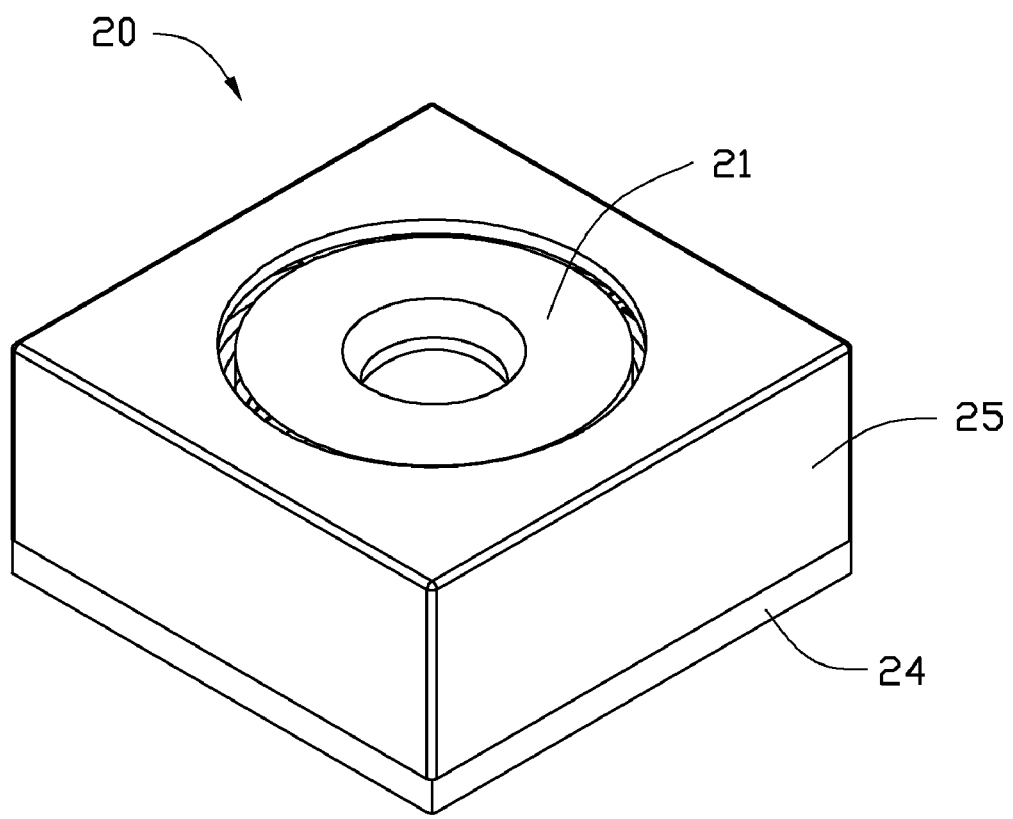
FIG. 2 is an isometric view of a camera module of the portable electric device of FIG. 1.
Figure 3:
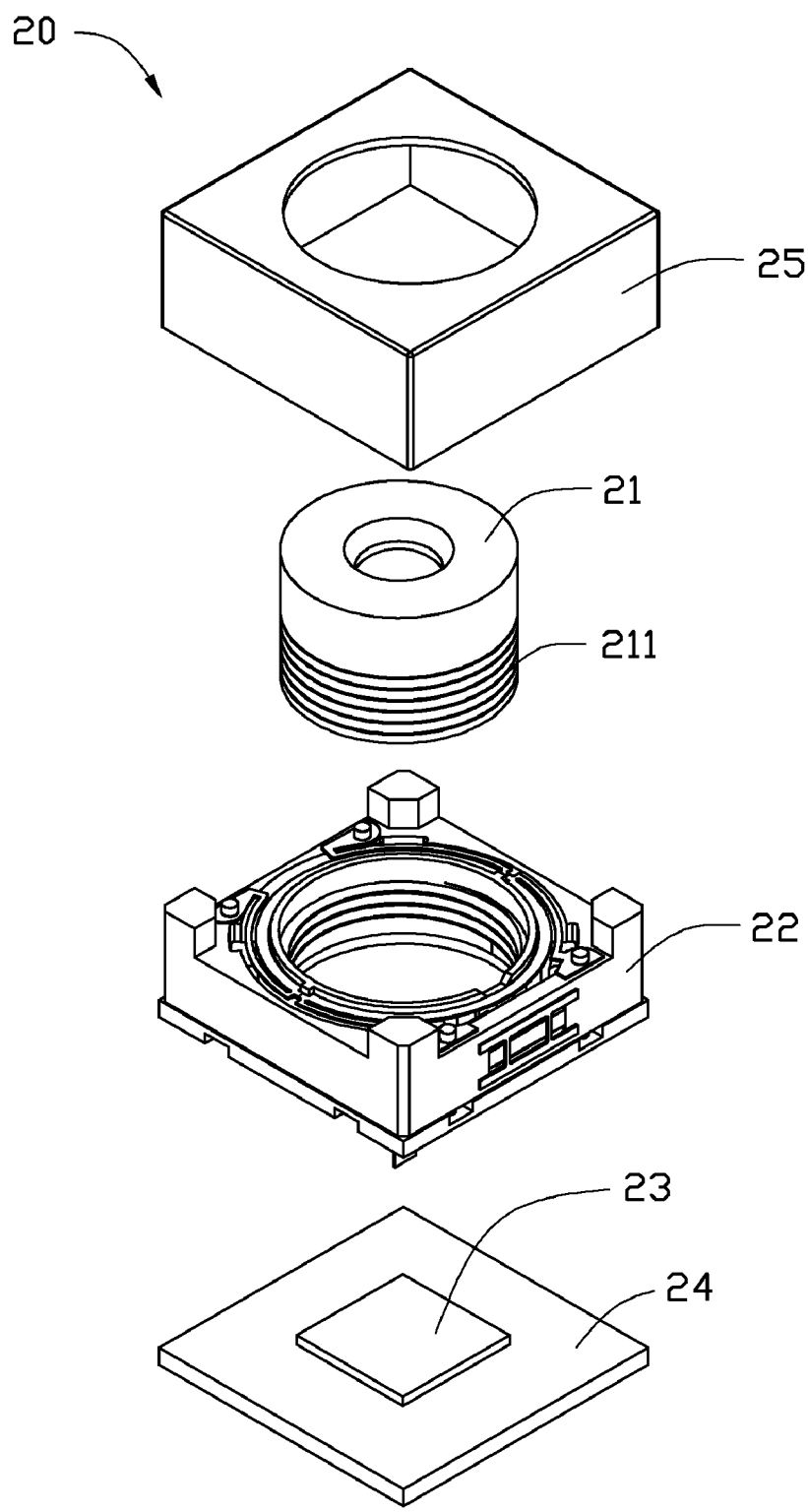
FIG. 3 is an exploded, isometric view of the camera module of FIG. 2.

Referring to FIGS. 2-3, the auto-focusing camera module 20 includes a lens barrel 21 receiving a lens therein, a piezoelectric driving module 22 for moving the lens barrel 21 for auto-focusing, an image sensor 23 mounted on a printed circuit board 24. A shell 25 is configured for protecting the lens barrel 21, the piezoelectric driving module 22 and the image sensor 23 from being damaged by exterior conditions.

The lens barrel 21 is a substantially hollow cylinder, and includes a plurality of outer threads 211 formed on the outer surface of the lens barrel 21.

Figure 4:
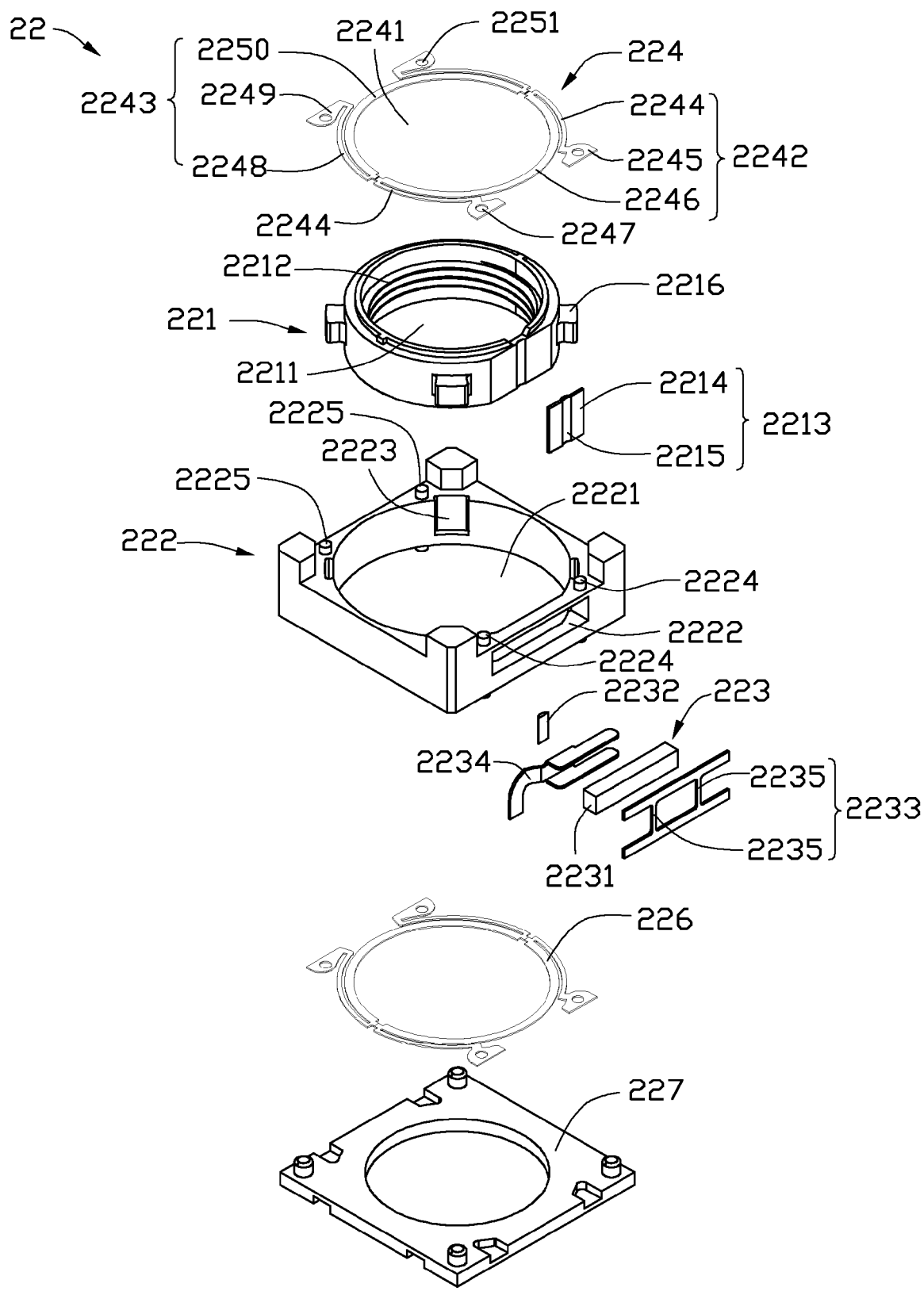
FIG. 4 is an exploded, isometric view of a piezoelectric driving module of the camera module of FIG. 2.

Referring to FIG. 4, the piezoelectric driving module 22 is configured for receiving the lens barrel 21 and moving the lens barrel 21 and the lens in the optical axis direction. The piezoelectric driving module 22 includes a movable barrel 221 for receiving the lens barrel 21, a fixed barrel 222 for receiving the movable barrel 221, a piezoelectric actuator 223 for moving the movable barrel 221 relative to the fixed barrel 222, an upper spring member 224, a lower spring member 226, and a supporting base 227 for supporting the piezoelectric actuator 223.

The movable barrel 221 is a substantially hollow cylinder, and includes a first receiving cavity 2211 defined at the center thereof, and a plurality of inner threads 2212 defined in the inner surface of the first receiving cavity 2211. The first receiving cavity 2211 is configured for receiving the lens barrel 21. The inner threads 2212 threadedly engage with the outer threads 211, thereby making the lens barrel 21 be fixedly received in the movable barrel 221. A friction plate 2213 is mounted on the outer surface of the movable barrel 221 for interacting with the piezoelectric actuator 223. The friction plate 2213 is made of wear resisting material, such as stainless steel, chrome-wear resisting material, manganese-wear resisting material, etc. The friction plate 2213 includes a surface 2214 opposite to the piezoelectric actuator 223. The surface 2214 defines a groove 2215. The lengthwise direction of the groove 2215 is parallel with the central axis of the movable barrel 221.

A plurality of first positioning members 2216 are formed on the outer surface of the movable barrel 221. The axial direction of each first positioning member 2216 is parallel with the central axis of the movable barrel 221. In the present embodiment, the first positioning members 2216 are centrosymmetric around the center of the movable barrel 221, and each first positioning member 2216 is a protrusion. In other embodiments, each first positioning member 2216 could be a recess.

The fixed barrel 222 is a substantially hollow cube, and is mounted on the supporting base 227. The fixed barrel 222 includes a second receiving cavity 2221 for receiving the movable barrel 221 with the lens barrel 21. In other embodiments, the fixed barrel 222 could be a hollow cylinder, a hollow pentagonal prism, etc. A third receiving cavity 2222 communicating with the second receiving cavity 2221 is defined in the sidewall of the fixed barrel 222. The third receiving cavity 2222 is configured for partially receiving the piezoelectric actuator 223. In the present embodiment, the third receiving cavity 2222 not only runs through the inner surface of the sidewall of the fixed barrel 222, but also the outer surface of the sidewall of the fixed barrel 222. In alternative embodiments, the third receiving cavity 2222 could be only run through the inner surface of the sidewall of the fixed barrel 222.

A plurality of second positioning members 2223 are formed on the inner surface of the fixed barrel 222. The second positioning members 2223 engage with the respective first positioning members 2216 for preventing the movable barrel 221 from greatly rotating relative to the fixed barrel 222, thereby preventing the upper spring members 224 and the lower spring members 226 mounted on the movable barrel 221 from receiving big torque. In the present embodiment, each second positioning member 2223 is a recess. Four upper locating pins 2224 and 2225 are formed on the upper end surface of the fixed barrel 222. The upper locating pins 2224 and 2225 are configured for locating the upper spring members 224 on the upper end surface of the fixed barrel 222. In the present embodiment, the distance between each upper locating pin 2224 and the central axis of the fixed barrel 222 is longer than the distance between each upper locating pin 2225 and the central axis of the fixed barrel 222. In other embodiments, the upper locating pins 2224 and 2225 could be centrosymmetric around the center of the fixed barrel 222. Four lower locating pins (not shown) are formed on the lower end surface of the fixed barrel for locating the lower spring member 226 on the lower end surface of the fixed barrel 222. The four lower locating pins are similar to, and respectively correspond to the four upper locating pins 2224 and 2225.

The piezoelectric actuator 223 is a piezoelectric ultrasonic motor, and includes a piezoelectric body 2231, a friction member 2232, and a supporting member 2233.

The piezoelectric body 2231 electrically connects to a power cable 2234. The power cable 2234 electrically connects to a plurality of electrode terminals (not shown) to supply power to the piezoelectric body 2231. In response to the power supplied through the electrode terminals, the sidewalls of the third receiving cavity 2222 cannot prevent the piezoelectric body 2231 from deforming, therefore the piezoelectric body 2231 deforms.

The friction member 2232 mounted on the piezoelectric body 2231 is substantially a semi-cylinder, and faces the surface 2214 of the friction plate 2213. The friction member 2232 is not limited to a semi-cylinder, and can be a cylinder, a box, etc., as long as the friction member 2232 allows transfer of friction force to the movable barrel 221. It is preferable that the friction member 2232 is made of a ceramic or metallic material having excellent wear resistance and a relatively large friction coefficient. In the present embodiment, the friction member 2232 is partially received in the groove 2215, and is in frictional contact with the groove 2215, so that a sufficient friction force can generate between the friction member 2232 and the groove 2215. In alternative embodiment, the groove 2215 could be omitted. In such case, a friction force can be generated between the friction plate 2213 and the friction member 2232. In other alternative embodiment, the friction plate 2213 could be omitted. In such case, a friction force can be generated between the movable barrel 221 and the friction member 2232.

The supporting member 2233 is mounted on the outer surface of the fixed barrel 222, and covers the third receiving cavity 2222. The supporting member 2233 is configured for supporting the piezoelectric body 2231, and cannot prevent the piezoelectric body 2231 from deforming. The supporting member 2233 includes two parallel supporting strips 2235. The two supporting strips 2235 respectively support the two ends of the piezoelectric body 2231 thereon. In the present embodiment, the two supporting strips 2235 are parallel with the central axis of the fixed barrel 222. In alternative embodiment, the supporting member 2233 may be mounted on the sidewall of the third receiving cavity 2222. In other alternative embodiment, the fixed barrel 222 may not have the third receiving cavity 2222. In such case, the supporting member 2233 can be mounted on the inner surface of the fixed barrel 222.

When the piezoelectric body 2231 is powered through the power cable 2234, the piezoelectric body 2231 deforms, thereby making the friction member 2232 generate elliptical vibrations. Then, a friction force is generated between the friction member 2232 and the friction plate 2213 to drive the movable barrel 221 with the lens barrel 21 to move along the central axis of the fixed barrel 222, thereby achieving auto-focusing function.

The upper spring member 224 is substantially a plate body, and is located on the upper end of the movable barrel 221. The upper spring member 224 is configured for providing an resilient force such that the movable barrel 221 is in frictional contact with the friction member 2232, thereby making the friction member 2232 driven by the piezoelectric body 2231 frictionally drive the movable barrel 221 to move along the central axis of the fixed barrel 222. A through hole 2241 is defined in the center of the upper spring member 224. The through hole 2241 is configured for allowing light to pass through the upper spring member 224. The upper spring member 224 includes a first arc body 2242, and a second arc body 2243 connected with the first arc body 2242. In the present embodiment, the first arc body 2242 and the second arc body 2243 are respectively produced, and then are adhered to each other by adhesive to form the upper spring member 224. In alternative embodiment, the upper spring member 224 may not have the second arc body 2243. In other alternative embodiments, the upper spring member 224 may be a spring. In such case, the spring is adjacent to the piezoelectric body 2231, and the two ends of the spring respectively connect to the movable barrel 221 and the fixed barrel 222.

The first arc body 2242 is adjacent to the piezoelectric body 2231, and is an axially symmetrical plate body. The first arc body 2242 includes two symmetrical first spring arms 2244, two symmetrical first outer fixed portions 2245, and a first inner fixed portion 2246.

The two ends of one of the first spring arms 2244 respectively connect one of the two outer fixed portions 2245 to the first inner fixed portion 2246. The two ends of the other first spring arm 2244 respectively connect the other outer fixed portion 2245 to the first inner fixed portion 2246. In the present embodiment, each first spring arm 2244 is an arc structure. In alternative embodiments, each first spring arm 2244 may be an S-shaped structure, an L-shaped structure, etc.

The two first outer fixed portions 2245 are mounted on the right end surface of the fixed barrel 222. Each first outer fixed portion 2245 defines a locating hole 2247. The two locating holes 2247 engage with the respective upper locating pins 2224 to locate the two first outer fixed portions 2245 on the fixed barrel 222. In the present embodiment, the first outer fixed portions 2245 are securely mounted on the fixed barrel 222 with adhesive.

The first inner fixed portions 2246 is securely mounted on the right end surface of the movable barrel 221.

The second arc body 2243 is away from the piezoelectric body 2231, and is an axially symmetrical body. The second arc body 2243 includes two symmetrical second spring arms 2248, two symmetrical second outer fixed portions 2249, and a second inner fixed portion 2250. In the present embodiment, each second spring arm 2248 is an arc structure. In alternative embodiments, each second spring arm 2248 may be an S-shaped structure, an L-shaped structure, etc.

The two ends of one of the second spring arms 2248 respectively connect one of the two outer fixed portions 2249 to the second inner fixed portion 2250. The two ends of the other second spring arm 2248 respectively connect the other outer fixed portion 2249 to the second inner fixed portion 2250. In the present embodiment, each second spring arm 2248 is an arc structure. In alternative embodiments, each second spring arm 2248 could be an S-shaped structure, an L-shaped structure, etc.

The two second outer fixed portions 2249 are mounted on the left end surface of the fixed barrel 222. Each second outer fixed portion 2249 defines a locating hole 2251. The two locating holes 2251 engage with the respective upper locating pins 2225 to locate the two second outer fixed portions 2249 on the fixed barrel 222. In the present embodiment, the second outer fixed portions 2249 are securely mounted on the fixed barrel 222 with adhesive.

The second inner fixed portions 2250 is securely mounted on the left end surface of the movable barrel 221.

After the upper spring plate 224 is securely mount on the upper end surface of the fixed barrel 222, the resilient force provided by each second spring arm 2248 is smaller than the resilient force provided by each first spring arm 2244. Therefore, the friction plate 2213 of the movable barrel 221 can be in frictional contact with the friction member 2232, thereby making the friction member 2232 driven by the deformation of the piezoelectric body 2231 to actuate frictionally the friction plate 2231 to move. That is, the friction member 2232 driven by the deformation of the piezoelectric body 2231 frictionally moves the movable barrel 221 with the barrel 21 for auto-focusing function. In addition, with the help of the first spring arms 2244 and the second spring arm 2248, there is a possibility of very little axial misalignment of the movable barrel 221 and the fixed barrel 222.

In the present embodiment, each first spring arm 2244 is same as each second spring arm 2248. In assembly of the upper spring member 224, the movable barrel 221, and the fixed barrel 222, the first inner portions 2246 and the second inner portions 2250 are firstly securely mounted on the right and left upper end surfaces of the movable barrel 221. Then, the two second outer fixed portions 2249 are securely mounted on the left upper end surface of the fixed barrel 222. Next, the two first outer fixed portions 2245 are securely mounted on the right upper end surface of the fixed barrel 222. In such case, because the distance between each upper locating pin 2224 and the central axis of the fixed barrel 222 is longer than the distance between each upper locating pin 2225 and the central axis of the fixed barrel 222, the central axis of the movable barrel 221 misaligns with the central axis of the fixed barrel 222, and the central axis of the movable barrel 221 is near the piezoelectric body 2231. Finally, the supporting member 2233 with the piezoelectric body 2234 is mounted on the fixed barrel 222, such that the friction member 2232 mounted on the piezoelectric body 2231 pushes the friction plate 2213 until the central axis of the movable barrel 221 aligns with the central axis of the fixed barrel 222. In such case, the two second spring arms 2248 retain shape, and the two first spring arms 2244 deform.

Thus, the assembly of the upper spring member 224, the movable barrel 221, and the fixed barrel 222 is completed. In such case, the resilient force provided by each second spring arm 2248 is smaller than the resilient force provided by each first spring arm 2244, and the friction plate 2232 is in frictional contact with the friction plate 2213.

In alternative embodiment, the upper locating pins 2224 and 2225 could be centrosymmetric around the center of the fixed barrel 222, and each second spring arm 2248 may be the same as each first spring arm 2244 except for elasticity. In such case, as long as the elasticity of each second spring arm 2248 is smaller than the elasticity of each first spring arm 2244, the resilient force provided by each second spring arm 2248 will be smaller than the resilient force provided by each first spring arm 2244.

In other alternative embodiment, the upper locating pins 2224, 2225 may be centrosymmetric around the center of the fixed barrel 222, and each second spring arm 2248 may be the same as each first spring arm 2244 except for width. In such cases, as long as the width of each second spring arm 2248 is greater than that of each first spring arm 2244, the resilient force provided by each second spring arm 2248 will be smaller than the resilient force provided by each first spring arm 2244.

In yet still other alternative embodiments, the upper locating pins 2224 and 2225 could be centrosymmetric around the center of the fixed barrel 222, and each second spring arm 2248 may be the same as each first spring arm 2244 except for coefficient of elasticity. In such cases, as long as the coefficient elasticity of each second spring arm 2248 is smaller than that of each first spring arm 2244, the resilient force provided by each second spring arm 2248 will be smaller than the resilient force provided by each first spring arm 2244.

The lower spring plate 226 is same as the upper spring plate 224, and the assembly of the lower spring plate 226, the movable barrel 221, and the fixed barrel 222 is same as that of the upper spring plate 224, the movable barrel 221, and the fixed barrel 222. In such case, after the assembly of the upper spring plate 224, the lower spring plate 226, the movable barrel 221, and the fixed barrel 222 is completed, the piezoelectric body 2231 can be mounted on the fixed barrel 222, so that the friction member 2232 mounted on the piezoelectric body 2231 pushes the friction plate 2213 until the central axis of the movable barrel 221 aligns with the central axis of the fixed barrel 222. In alternative embodiment, there may be no lower spring plate 226. In other alternative embodiments, there may be no upper spring plate 224.

When the piezoelectric body 2231 is powered through the power cable 2234, the piezoelectric body 2231 will deform, thereby making the friction member 2232 generate elliptical vibrations. Then, a friction force will generate between the friction member 2232 and the friction plate 2213 to drive the movable barrel 221 to move along the central axis of the fixed barrel 222, thereby achieving auto-focusing. In addition, the piezoelectric body 2231 is received in the fixed barrel 222, thereby making the piezoelectric actuator 223 more compact. After capturing image, the piezoelectric body 2231 can be switched off. Then, the first spring arms 2244 and the second spring arms 2248 can impart a restoring force to the movable barrel 221 (i.e. lens barrel 21) thereby returning the movable barrel 221 to a former position thereof. Thus, the auto-focusing camera module 20 needs little power for auto-focusing.

Figure 5:
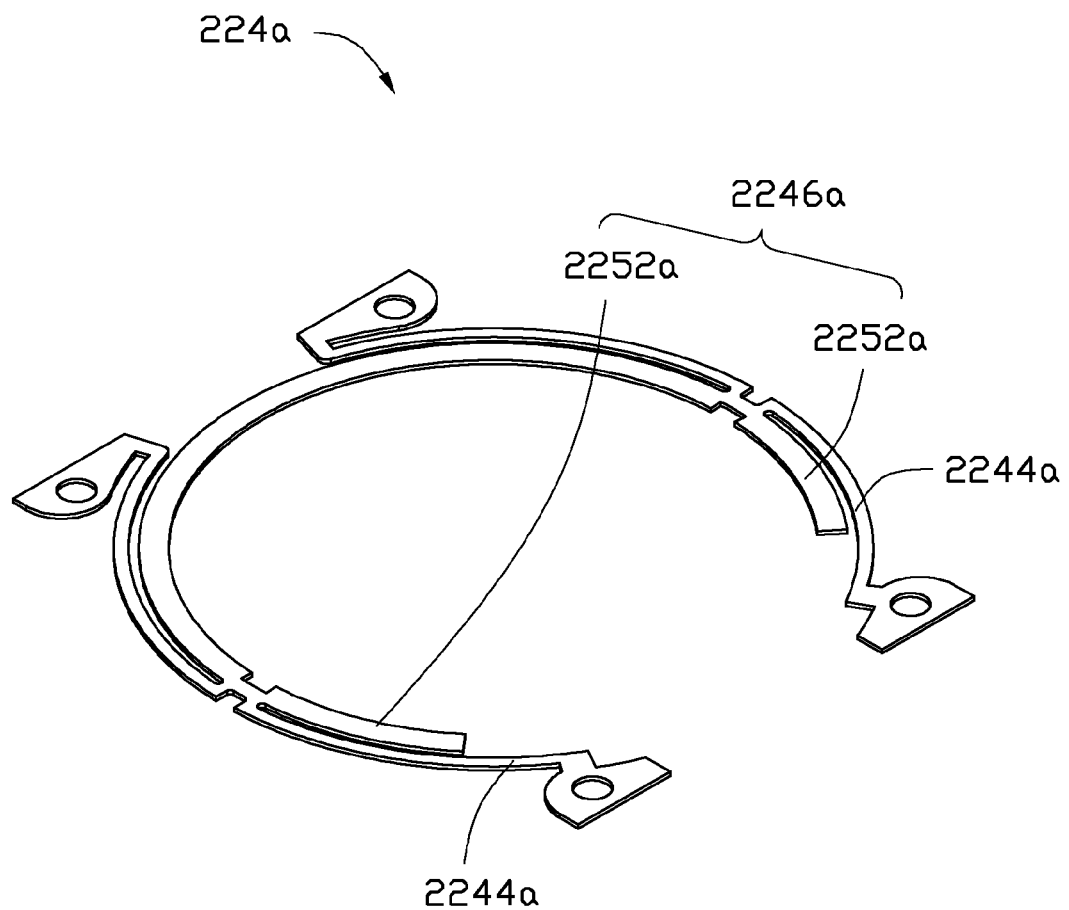
FIG. 5 is an isometric view of a flat plate spring according to a second embodiment.

Referring FIG. 5, an upper spring plate 224*a*, in accordance with a second embodiment, is shown. The upper spring plate 224*a* includes two first spring arms 2244*a* and a first inner fixed portion 2246*a*. The first inner fixed portion 2246*a* includes two spaced arc structures 2252*a* for preventing the resilient forces of the first spring arms 2244*a* from interacting with each other.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:
1. A piezoelectric driving module comprising:
a movable barrel;
a fixed barrel receiving the movable barrel therein;
a piezoelectric actuator, the piezoelectric actuator being configured for moving the movable barrel relative to the fixed barrel, the piezoelectric actuator comprising a piezoelectric body mounted on a sidewall of the fixed barrel and a friction member mounted on the piezoelectric body, the piezoelectric body being configured for causing elliptical vibration of the friction member, the friction member being in frictional contact with the movable barrel; and a spring member, the spring member connecting the movable barrel to the fixed barrel, the spring member being configured for providing a resilient force such that the friction member can be driven by the piezoelectric body to move the movable barrel along a central axis of the fixed barrel.

2. The piezoelectric driving module of claim 1, further comprising a friction plate mounted on an outer surface of the movable barrel, the friction plate is opposite to the friction member, and is in frictional contact with the friction member.

3. The piezoelectric driving module of claim 2, wherein the friction plate comprises a surface opposite to the friction member, and a groove defined on the surface, the groove receives the friction member therein, and is in frictional contact with the friction member.

4. The piezoelectric driving module of claim 1, wherein the spring member comprises a first arc body located on one end of the movable barrel, the first arc body is an axially symmetrical plate body, and is adjacent to the piezoelectric body, the first arc body comprises two symmetrical first spring arms, two ends of each first spring arm are respectively connected with the movable barrel and the fixed barrel, the first spring arms are configured for providing resilient forces to make the movable barrel be in frictional contact with the friction member.

5. The piezoelectric driving module of claim 4, wherein the first arc body comprises two symmetrical first outer fixed portions and a first inner fixed portion, the first outer fixed portions are mounted on an end surface of the fixed barrel, the first inner fixed portion is mounted on an end surface of the movable barrel, one of the first spring arms connects one of the first outer portions to the first inner fixed portion, the other one of the first spring arms connects the other one of the first outer portions to the first inner fixed portion.

6. The piezoelectric driving module of claim 4, wherein the spring member comprises a second arc body connected with the first arc body, the second arc body comprises two symmetrical second spring arms, two ends of each second spring arm are respectively connected with the movable barrel and the fixed barrel, the second spring arms are configured for providing resilient forces smaller than the resilient forces provided by the first spring arms.

7. The piezoelectric driving module of claim 6, wherein the first spring arms are the same as the second spring arms except the elasticity of the first spring arms is greater than that of the second spring arms.

8. The piezoelectric driving module of claim 6, wherein the first spring arms are the same as the second spring arms except the width of the first spring arms is greater than that of the second spring arms.

9. The piezoelectric driving module of claim 6, wherein the first spring arms are the same as the second spring arms except the efficient of elasticity of the first spring arms is greater than that of the second spring arms.

10. A camera module comprising:
a lens module;
a movable barrel receiving the lens module therein;
a fixed barrel receiving the movable barrel therein;
a piezoelectric actuator, the piezoelectric actuator being configured for moving the movable barrel and the lens module relative to the fixed barrel, the piezoelectric actuator comprising a piezoelectric body mounted on a sidewall of the fixed barrel and a friction member mounted on the piezoelectric body, the piezoelectric body being configured for causing elliptical vibration of the friction member, the friction member being in frictional contact with the movable barrel; and a spring member, the spring member connecting the movable barrel to the fixed barrel, the spring member being configured for providing a resilient force such that the friction member can be driven by the piezoelectric body to move the movable barrel and the lens module for performing an auto-focusing function.

11. The camera module of claim 10, further comprising a friction plate mounted on an outer surface of the movable barrel, the friction plate being opposite to the friction member, and in frictional contact with the friction member.

12. The camera module of claim 11, wherein the friction plate comprises a surface opposite to the friction member, and a groove defined on the surface, the groove receives the friction member therein, and is in frictional contact with the friction member.

13. The camera module of claim 10, wherein the spring member comprises a first arc body located on one end of the movable barrel, the first arc body is an axially symmetrical plate body, and is adjacent to the piezoelectric body, the first arc body comprises two symmetrical first spring arms, two ends of each first spring arm are respectively connected with the movable barrel and the fixed barrel, the two first spring arms are configured for providing resilient forces to make the movable barrel be in frictional contact with the friction member.

14. The camera module of claim 13, wherein the first arc body comprises two symmetrical first outer fixed portions and a first inner fixed portion, the first outer fixed portions are mounted on an end surface of the fixed barrel, the first inner fixed portion is mounted on an end surface of the movable barrel, one of the first spring arms connects one of the first outer portions to the first inner fixed portion, the other one of the first spring arms connects the other one of the first outer portions to the first inner fixed portion.

15. The camera module of claim 13, wherein the spring member comprises a second arc body connected with the first arc body, the second arc body comprises two symmetrical second spring arms, two ends of each second spring arm are respectively connected with the movable barrel and the fixed barrel, the second spring arms are configured for providing resilient forces smaller than the resilient forces provided by the first spring arms.

16. The camera module of claim 15, wherein the first spring arms are the same as the second first spring arms except the elasticity of the first spring arms is greater than that of the second spring arms.

17. The camera module of claim 15, wherein the first spring arms are the same as the second first spring arms except the width of the first spring arms is greater than that of the second spring arms.

18. The camera module of claim 15, wherein the first spring arms are the same as the second first spring arms except the efficient of elasticity of the first spring arms is greater than that of the second spring arms.

19. A portable electronic device comprising:
a main body; and
a camera module mounted on the main body, the camera module comprising:
a lens module;
a movable barrel receiving the lens module therein;

a fixed barrel receiving the movable barrel therein;
a piezoelectric actuator, the piezoelectric actuator being configured for moving the movable barrel and the lens module relative to the fixed barrel, the piezoelectric actuator comprising a piezoelectric body mounted on a sidewall of the fixed barrel and a friction member mounted on the piezoelectric body, the piezoelectric body being configured for causing elliptical vibration of the friction member, the friction member being in frictional contact with the movable barrel; and
a spring member, the spring member connecting the movable barrel to the fixed barrel, the spring member being configured for providing a resilient force such that the friction member can be driven by the piezoelectric body to move the movable barrel and the lens module for performing an auto-focusing function.

20. The portable electronic device of claim 19, wherein the spring member comprises a first arc body located on one end of the movable barrel, the first arc body is an axially symmetrical plate body, and is adjacent to the piezoelectric body, the first arc body comprises two symmetrical first spring arms, two ends of each first spring arm respectively connects with the movable barrel and the fixed barrel, the first spring arms are configured for providing resilient forces to make the movable barrel be in frictional contact with the friction member.

* * * * *